United States Patent [19]

Gulli et al.

[11] Patent Number: 5,058,081

[45] Date of Patent: Oct. 15, 1991

[54] METHOD OF FORMATION OF CHANNELS FOR A SONAR, IN PARTICULAR FOR A TOWED-ARRAY SONAR

[75] Inventors: Christian Gulli, Landunvez-Porspoder; Jean Le Gall; Georges Grall, both of Conquet, France

[73] Assignee: Thomson-CSF, Puteaux, France

[21] Appl. No.: 582,330

[22] Filed: Sep. 14, 1990

[30] Foreign Application Priority Data

Sep. 15, 1989 [FR] France .................. 89 12107

[51] Int. Cl.$^5$ .................................. G01S 3/80
[52] U.S. Cl. ............................... 367/123; 367/130
[58] Field of Search ............... 367/99, 103, 105, 119, 367/130, 122, 123

[56] References Cited

U.S. PATENT DOCUMENTS

| 4,041,442 | 8/1977 | Marquardt | 367/130 |
|---|---|---|---|
| 4,234,939 | 11/1980 | Grall | 367/87 |
| 4,509,152 | 4/1985 | Buhart | 367/123 |
| 4,510,586 | 4/1985 | Grall et al. | 367/87 |
| 4,596,007 | 6/1986 | Grall et al. | 367/92 |
| 4,604,736 | 8/1986 | Demeure | 367/123 |
| 4,779,239 | 10/1988 | Grall | 367/88 |
| 4,794,574 | 12/1988 | Grall | 367/87 |
| 4,951,268 | 8/1990 | Grall | 367/88 |

Primary Examiner—Daniel T. Pihulic
Attorney, Agent, or Firm—Oblon, Spivak, McClelland, Maier & Neustadt

[57] ABSTRACT

In a method of formation of channels for a sonar, after having sampled at a frequency $T = \frac{1}{4} f_0$ (where $f_0$ is the receiving center frequency of the sonar) the signals from the hydrophones of the sonar and having translated them to baseband, the signals thus translated are subsampled with a period $T_{SE} = kT$ (wherein k is an integer) substantially equal to 1.25 B, where B is the reception bandwidth of the sonar. A first set of signals is subsampled at identical times to form a frontal sector. Two further sets of signals are subsampled with delays between the signals from two adjacent hydrophones equal to T, which determines two side sectors adjacent to the frontal sector. The subsampled signals are then transmitted serially by the towing cable of the sonar device towed array and are processed in FFT circuits which allow to form in each sector a set of channels covering the sector. This allows to considerably reduce the data transmission rate between the towed portion of the sonar and the portion located in the towing ship.

4 Claims, 3 Drawing Sheets

METHOD OF FORMATION OF CHANNELS FOR A SONAR, IN PARTICULAR FOR A TOWED-ARRAY SONAR

BACKGROUND OF THE INVENTION

1. Field of the Invention

The present invention relates to methods that allow to the formation of channels in sonar devices. It applies more particularly to towed-array sonar devices, in which the data must be transmitted by the towing cable whose transmission rate is necessarily limited.

2. Discussion of the Background

As shown in FIG. 1, a simple sonar array comprises a number of hydrophones 1 through N distributed with a pitch d along a line segment.

The signals received by these hydrophones (more generally by these sensors) are combined both to obtain a received signal stronger than that from an isolated hydrophone and to derive data about the direction of the source transmitting the signal being received.

If the signals from all the hydrophones are simply summed, a directivity pattern is obtained which exhibits a direction of best reception perpendicular to the line segment along which the hydrophones are aligned. This best direction is referred to as a receive channel.

In order to be able to monitor a sector wider than that defined by this single front channel, it is known to sum the signals from the hydrophones with a phase shift which allows one to obtain channels in directions which depends on this phase shift.

As a matter of fact, the signals received from a source located in a direction $\theta$ with respect to the normal to the array exhibit a phase difference, at the frequency f, which is given for a sensor i with respect to the sensor 1 located on the far left in the Figure, by the formula:

$$\phi_i = \frac{2\pi f}{c} (i - 1) d \sin \theta \quad (1)$$

Thus if phase shifts are applied to the signals from the sensors, at an operating frequency $f_0$ given for a sensor i by the formula:

$$\phi_e = \frac{2\pi f_0}{c} (i - 1) d \sin \theta_0 \quad (2)$$

a directivity pattern is obtained which exhibits a maximum for the direction $\theta_0$ with respect to the normal to the antenna. A channel is thus formed in this direction $\theta_0$ and it is possible to form as many channels as desired, within the limits defined below, by applying adequate phase shifts.

The received signals are rarely pure frequencies, and when f is different from $f_0$, a rotation of the direction of the channel is observed which is given by the formula:

$$\sin \theta = \frac{f_0}{f} \sin \theta_0 \quad (3)$$

With regard to the orientation of the channel allowing to determine the direction of the source of the signal, there is thus an error in this direction being obtained. This error is more or less tolerable, and a common rule consists in admitting that it can attain a value equal to the half-width of the lobe at −3 dB of attenuation of the channel signal. This width $\theta_{-3}$ is given, with c being the velocity of propagation of sound waves in water and L the length of the array (equal to the distance between the end hydrophones), by the formula:

$$2 \sin \theta_{-3} = \frac{c}{fL} \quad (4)$$

With the bandwidth of the received signal being equal to B, the maximum frequency shift is equal to B/2.

For a frequency change $\delta f$, the degree of rotation of the lobe is obtained by deriving the formula (3) for $f = f_0$:

$$\delta(\sin \theta) = -\sin \theta_0 \frac{\delta f}{f_0} \quad (5)$$

Putting $\delta f = B/2$ and equating $(\sin \theta)$ to $\sin \theta_{-3}$, we obtain the following basic condition:

$$\frac{L \sin \theta_0}{c} < \frac{1}{B} \quad (6)$$

By noticing that the first term of this formula is equal to the distance P in FIG. 1, known as the depth of the array, this formula can be written as:

$$P = \frac{c}{B}.$$

The distance, or range, resolution is given by the expression c/2B which determines the band of frequencies to be used to achieved the desired resolution.

It can thus be seen that the monitored sector determined by the basic condition obtained above, i.e., $\theta_0$ maximum, is more narrow the higher the range resolution.

It is known, to increase this sector of observation, to use a so-called "delay + phase shift" technique in which the sector of observation is divided into n subsectors in which the basic condition can be fullfilled. To obtain these n subsectors, the array is oriented in an electronic manner toward the center of each of these subsectors by applying predetermined delays to the signals from the hydrophones. Within each of these subsectors, the phase-shift technique is used as seen above to obtain adequate channels.

When this operation is performed in the digital manner, which tends to become the general case, the signals from each of the hydrophones are sampled and then digitized, which leads to transmitting to the processing circuitry a considerable number of digital data.

In the case of a towed-array sonar device, the weight and the volume of the towed portions are reduced as much as possible by limiting them to the array and to a minimum number of processing circuits, that is most often to the sampling circuits and the analog-to-digital converters. The signals thus obtained are transmitted, most often in serial form, by connections included in the towing cable of the towed vehicle which contains the array and said circuits. It is then very difficult to transmit all these signals through these connections, in particular through connections of the coaxial type whose transmission rate is limited to a few dozens of megabits per second.

SUMMARY OF THE INVENTION

To reduce the number of signals thus transmitted from the vehicle to the towing ship, the present invention proposes a method according to claim 1.

BRIEF DESCRIPTION OF THE DRAWINGS

Other features and advantages of the present invention will become apparent from the following detailed description given as a non-limitative example with reference to the accompanying drawings, in which.

DESCRIPTION OF THE PREFERRED EMBODIMENT

Figure 2:
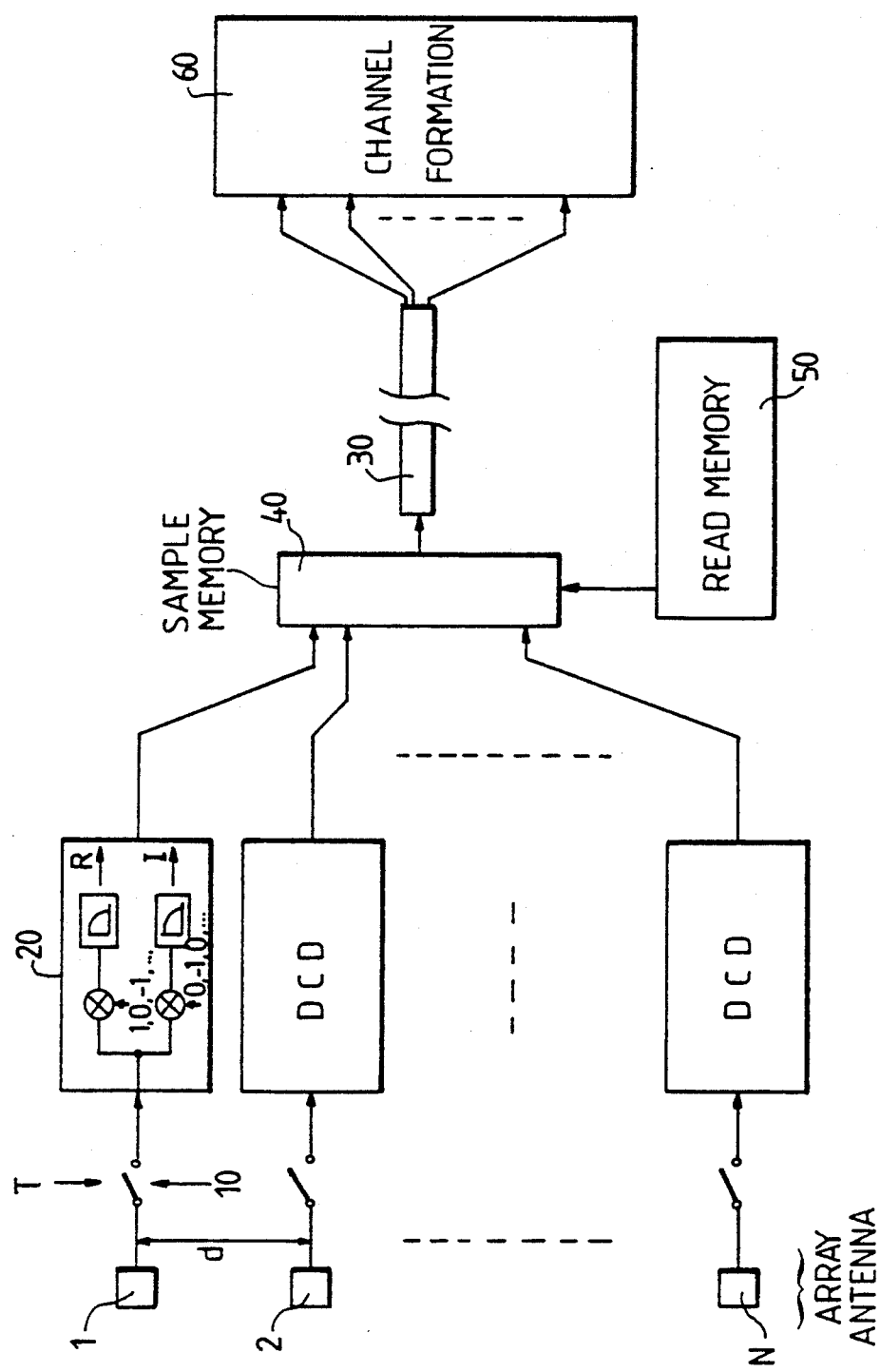
FIG. 2 is a block diagram of a sonar device according to the present invention.

Referring to FIG. 2, the signals from the sensors 1 through N are sampled by sampling circuits shown schematically in the Figure by switches 10, with a period $T=\frac{1}{2}f_0$. These signals are brought back to baseband in processing circuitry such as 20 referred to as digital complex demodulator (DCD). This complex demodulation consists in multiplying the signals by sin (2 $f_0$t) and cos (2 $f_0$t), then in filtering them in low-pass filters so as to obtain the real R and imaginary I components of the signal. By performing this operation in a digital manner and by choosing appropriately the sampling period to the value T, the sines and cosines assume at the sampling times the values 1, 0 and $-1$, which simplifies the multiplication operation. The latter reduces to pass the signal (multiply by 1), not pass it (multiply by 0), or inverse it (multiply by $-1$).

Figure 3:
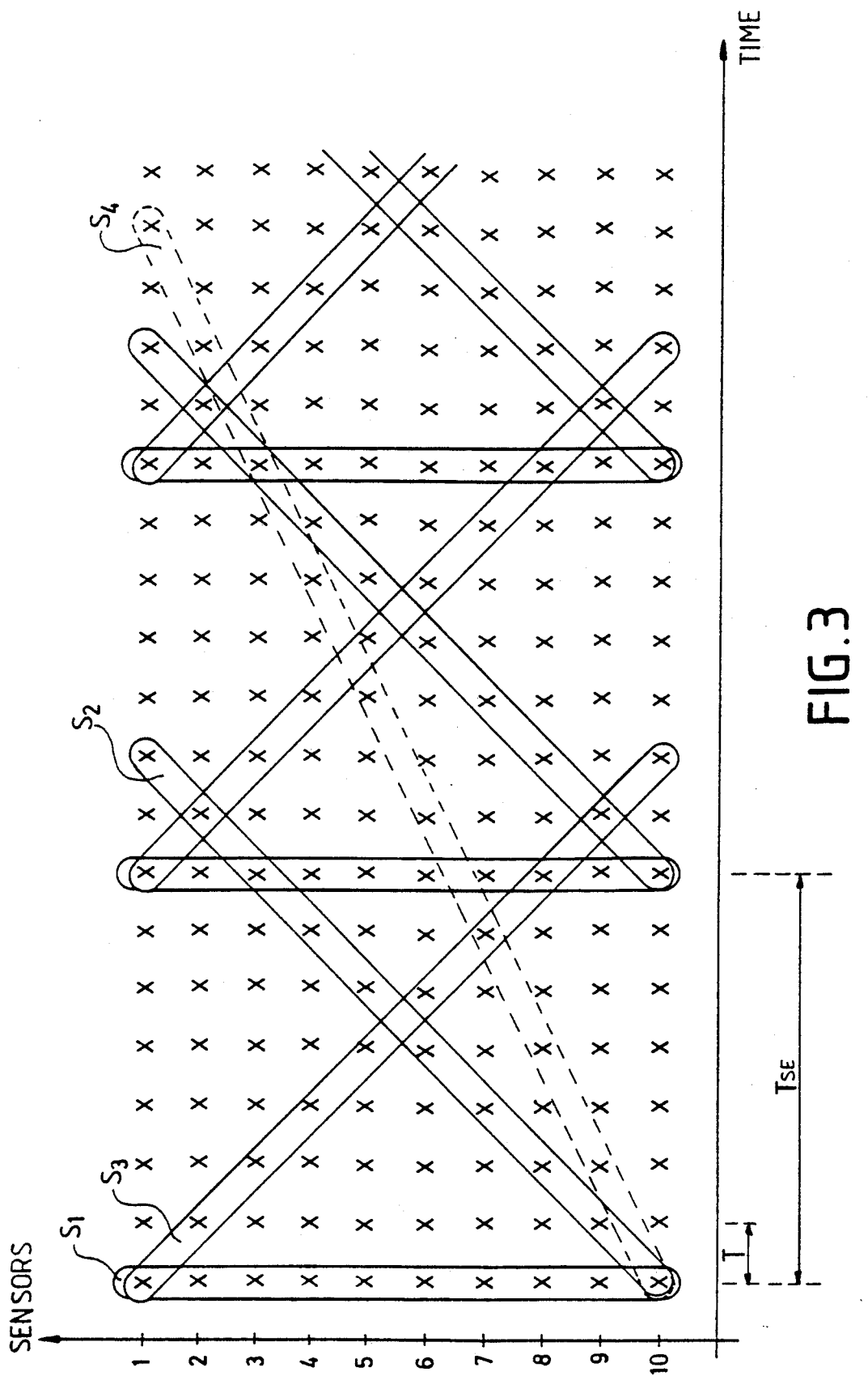
FIG. 3 is a signal sampling diagram.

There is thus obtained a set of digitized samples of the real and imaginary components of the baseband signals from the hydrophones. In FIG. 3, each pair of samples (1 real and 1 imaginary) is represented by a cross having as an abscissa the sampling time and as an ordinate the number of the sensor.

The transmission of all these samples, in addition digitally, would require a transmission line having a considerable transmission rate which is very difficult to incorporate into the towing cable shown in FIG. 2 with the reference numeral 30. To limit the necessary transmission rate, the sampling frequency is decreased by performing a subsampling of the signals from the sensors. The useful spectrum being limited to B/2, the sampling frequency is reduced to a frequency equal at least to B (sampling theorem) and rather equal to at least 1.25 B in practical applications, taking into account the fact that the filters cannot be infinitely steep-sloped. The subsampling period equal to $T_{SE}$ is chosen to be equal to $k \times T$. The parameter k will be chosen so as to fulfill the condition seen above, most often with excess since in the general case k, which is an integer, does not fall exactly on the value of the sampling frequency determined as seen above, which is unimportant.

Thus by taking all the samples which are aligned along a vertical corresponding to a time t, we obtain signals allowing to form channels in a frontal sector perpendicular to the array S1 whose width is limited on account of the pointing error due to the bandwidth as seen above.

To be able to widen the field of view, side sectors S2 and S3 adjacent to the frontal sector S1 are formed as shown in FIG. 3.

To this end, the antenna is electronically oriented to make it perpendicular to the central directions $\theta_D$ and $-\theta_D$ of these sectors S2 and S3 by delaying the signals arriving from the hydrophones. According to the present invention, this delay is equal, between two hydrophones, to the value T of the sampling period for the signals from the hydrophones. Thus, to form the channel S2 as not shown in FIG. 3, we use the signal from the sensor 10 delayed, the signal from the sensor 9 delayed by T, the signal from the sensor 8 delayed by 2T, etc., and the signal from the sensor 1 delayed by 9T.

Symmetrically, to form the sector S3, we use the signal from the sensor 1 not delayed, the signal from the sensor 2 delayed by T, etc., up to the sensor 10 delayed by 9T.

The delay T corresponds to the geometrical delay of the central channel of the side sectors 2 and 3, and we have thus the equation:

$$T=(d/c)\sin\theta_D=\tfrac{1}{2}f_0 \tag{7}$$

Taking into account the fact that the quantization of the delays is determined by T, and finally by the receiving center frequency, and that the maximum permissible width for each sector is determined by the bandwidth B, it is clear that the system thus obtained will not be optimum since there is no reason for the pointing angle of the side sectors, determined by T, to correspond to the maximum permissible limits of the sectors, which are determined by B. Nevertheless, in most practical cases, these sectors overlap rather little and it is sufficient, when forming the channels in the sectors, to eliminate those that would overlap. The loss in efficiency of the channel-forming hardware is very largely offset by the savings on the means which would be required if all samples were transmitted.

Of course, one is not limited to the formation of two side sectors, and it is possible to form more distant sectors by taking, for example, delays between two hydrophones equal to 2T, which forms a sector such as S4 in FIG. 3. In this case, the period T must be shorter than $\tfrac{1}{2}f_0$ to satisfy the sampling therorem.

The samples thus selected in FIG. 3 are serialized, then transmitted by the cable 30. This selection and this serialization are performed by means of very conventional means which comprise, for example, a sample memory 40 which is filled with the samples from digital complex demodulators 20 and which is then sequentially read under the control of a read memory 50 suitably programmed so as to transmit by the calbe 30 only the samples required to form the channels, and in a predetermined order that will one to find them again at the receiving end.

When counting in FIG. 3 the samples to be effectively transmitted during the time period $T_{SE}$, we find 22 of them when limiting the count to the sectors 1 through 3, whereas the complex digital demodulators provide 70 samples during this time interval. The reduction in transmission rate and, therefore, in required bandwidth of the cable is significant.

At the receiving end of the cable 30, the samples are sorted by means (not shown) using fully known techniques similar to those employed for the serialization of the samples at the input of the cable. After the samples corresponding to the three sectors have thus been separated and serialized, they are applied to a channel formation device 60 which uses, for example, circuits for computing the fast Fourier transform (FFT). Reference is made on this subject to the journal JASA 75(6) June 1984, pp. 1837–1847. These circuits deliver for the three sectors the desired channels among which those which are redundant are eliminated.

In a particular embodiment, the channels of the sonar device have been formed whose characteristics are the following:
$f_0 = 76$ kHz
$B = 7.5$ kHz
$N = 56$
$d = 17.3$ mm.

The transmission cable of this sonar comprises a coaxial cable whose transmission rate cannot exceed 30 megabits/second.

The basic condition for the array depth gives here a value of 12° for the maximum pointing angle.

The desired sector of observation is consequently divided into three sectors: a wide frontal sector of about 20° and two side sectors adjacent to this frontal sector and having a width of about 10°. The sector of observation has therefore an aperture substantially equal to 40°.

To this end, according to the present invention, the subsampling frequency is chosen equal to 9.5 kHz, which corresponds to a parameter k equal to 32. This sampling frequency is thus substantially equal to 1.27 times the bandwidth of the signal being received.

By digitizing the samples into 9-bit words, a transmission rate of 28.73 Mbit/s is obtained, which is lower than the limit of 30 Mbit/s of the transmission cable.

Taking into account the receiving center frequency, the offset angle $\theta_D$ of the center channels of the side sectors given by the formula (7) is equal to 16.57°.

For the reception at the other end of the cable, the formation of channels is performed in the processing circuits contained in the towing ship by means of three FFT devices operating on 64 values. This figure corresponds to circuits commercially available and one knows to use them from 56 samples delivered by the hydrophone by complementing to 64 by adding zeroes.

Figure 1:
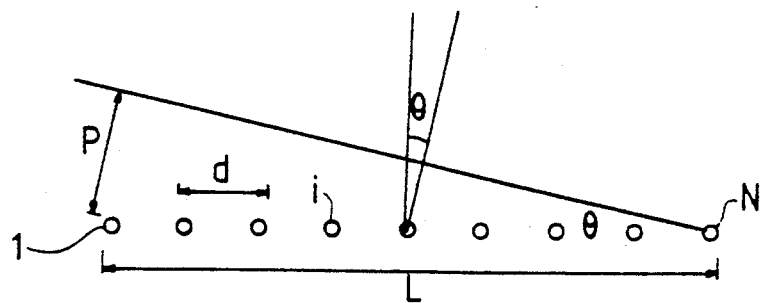
FIG. 1 is a schematic of a receiving array.
Figure 4:
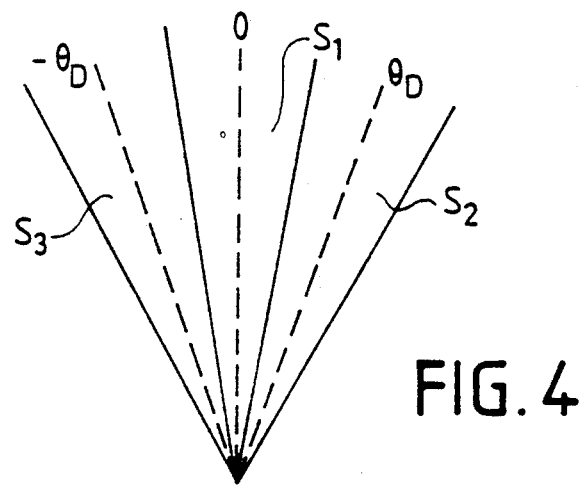
FIG. 4 is a schematic of a sector of observation.
Figure 5:
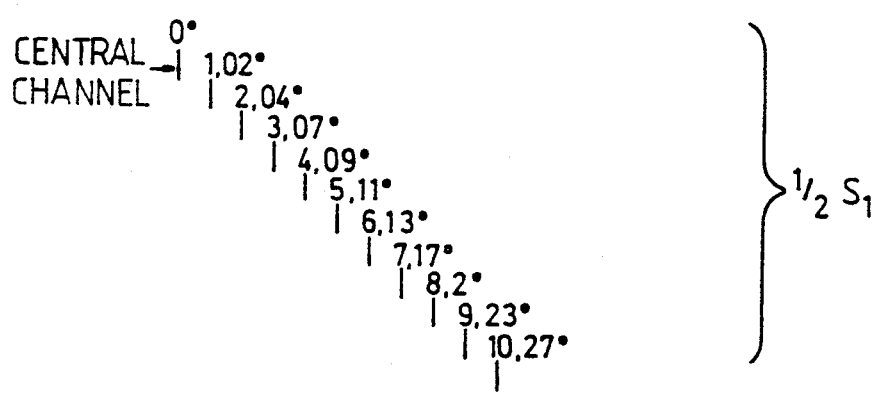
FIG. 5 is a channel distribution diagram.
Figure 5:
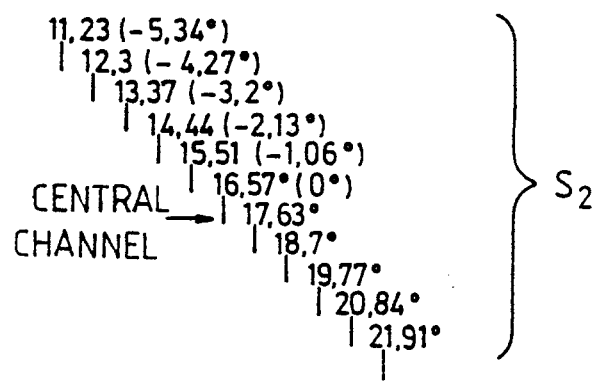

Among the three times 64 channels thus obtained, 43 are retained that cover an overall sector of 43.82° in accordance with the distribution shown in FIG. 5 which has been limited to one half of the frontal sector and the side sector S2, the other half S1 and the side sector S3 being symmetrical with respect to the central channel 0°.

In the sector S1, 21 channels are retained extending from 10.27° port to 10.27° starboard, with a central channel at 0°. The angular width of the 0° channel at 3 dB attenuation, obtained for a weighting of the Chebyshev type at −30 dB is 2 $\theta_3 = 1.28°$.

In the sector S2, 11 channels are retained extending from 11.23° to 21.91° about a central channel located at 16.57°. The angular width of this central channel is 2 $\theta_3 = 1.34°$.

The spacing between the adjacent outer channels of the sectors S1 and S2 is equal to 0.96°.

On the whole, the overlap between channels thus obtained is better than −3 dB.

The system described above allows one to consequently obtain a suitable coverage of the sector of observation with a minimum transmission rate in the towing cable, without requiring any interpolation between signals at the receiving end since all the samples required to form channels have been transmitted, which is not the case in other known systems.

As a variant, it is possible to perform demodulation of the signals from the sensors in an analog manner and then to perform a sampling of the real and imaginary components thus obtained by using a clock signal whose leading edges are shifted to obtain the correct sampling times.

Obviously, numerous modifications and variations of the present invention are possible in light of the above teachings. It is therefore to be understood that within the scope of the appended claims, the invention may be practiced otherwise than as specifically described herein.

What is claimed is:

1. A method of formation of channels for a sonar device for monitoring a sector of observation, in particular for a towed-array sonar device, said sonar device including an array of hydrophones delivering received signals, wherein said received signals are delayed to divide said sector of observation into a central sector and several separate sectors adjacent to said central sector, then the signals thus delayed are phase-shifted to form in each sector a set of channels, which method comprises:

sampling said signals from the hydrophones with a period T which is a function of the center frequency of reception $f_0$ of the sonar device and equal to the delay between two consecutive hydrophones, said delay corresponding to said two sectors adjacent to the central sector;

translating to baseband the signals thus sampled;

subsampling the signals thus translated with a period $T_{SE} = kT$ (where k is an integer) which is a function of the reception bandwidth B of the sonar device and selecting a set of N signals with the same rank determining said central sector, and shifting the sets of signals with respect to each other by a delay multiple of T determining said adjacent sectors;

serially transmitting the subsampled signals;

separating the transmitted signals corresponding to each sector; and forming in each sector a set of channels covering said sector.

2. A method according to claim 1, wherein $T = \frac{1}{4}f_0$, the translation being performed in accordance with the digital complex demodulation technique, and wherein $T_{SE}$ is substantially equal to 1.25 B.

3. A method according to claim 2, which comprises forming the channels of each sector by using a device implementing a fast Fourier transformation.

4. A method according to claim 3, which comprises utilizing a plurality of channels which exceeds the limits of the sector of interest so as to implement the transformation, wherein end channels which overlap adjacent channels are eliminated.

* * * * *